(No Model.) 6 Sheets—Sheet 1.
W. A. HULL & A. G. BOYER.
MACHINE FOR SHAPING PLASTIC MATERIALS.
No. 447,132. Patented Feb. 24, 1891.
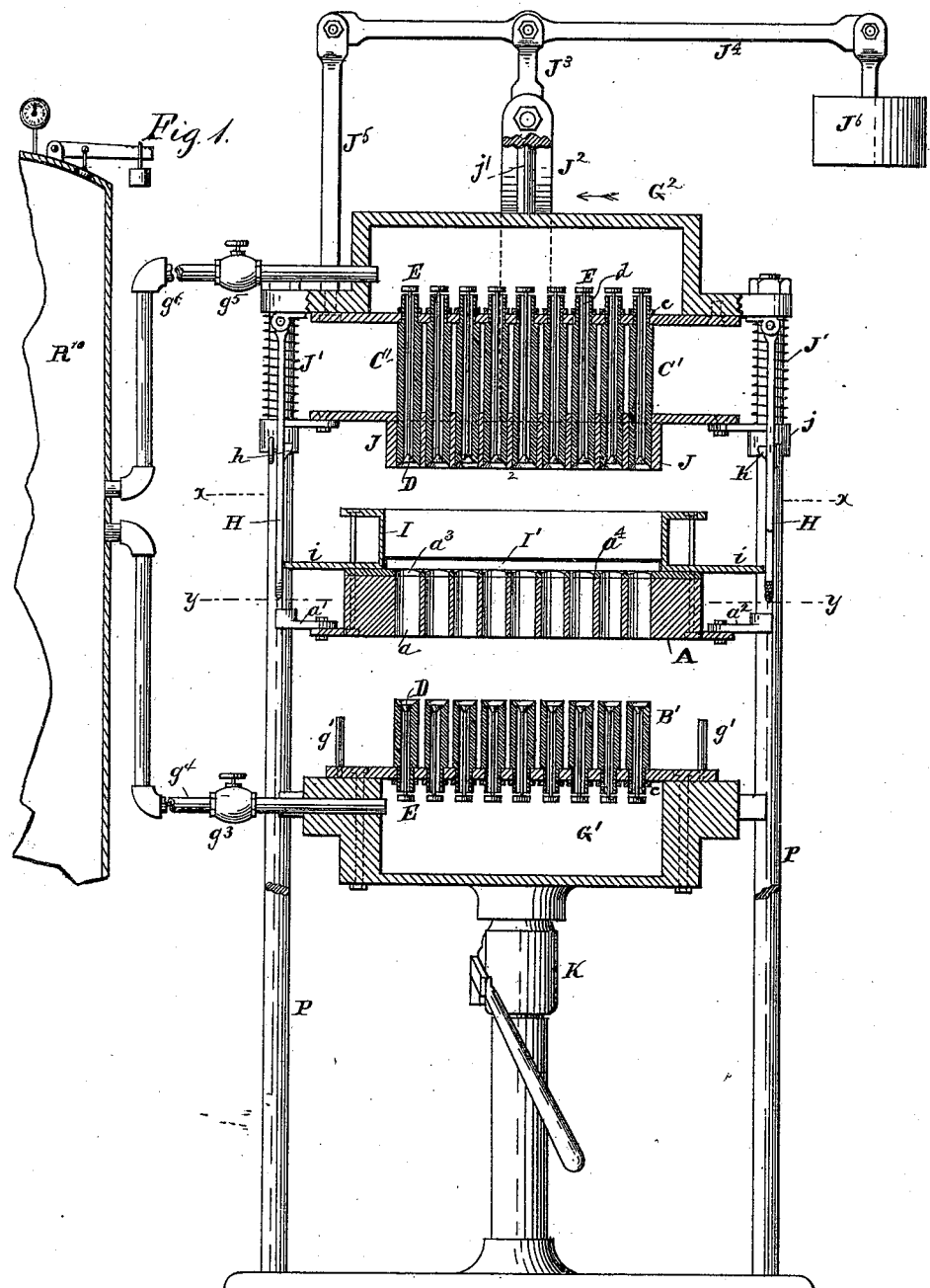
Witnesses
Inventors
By their Attorneys

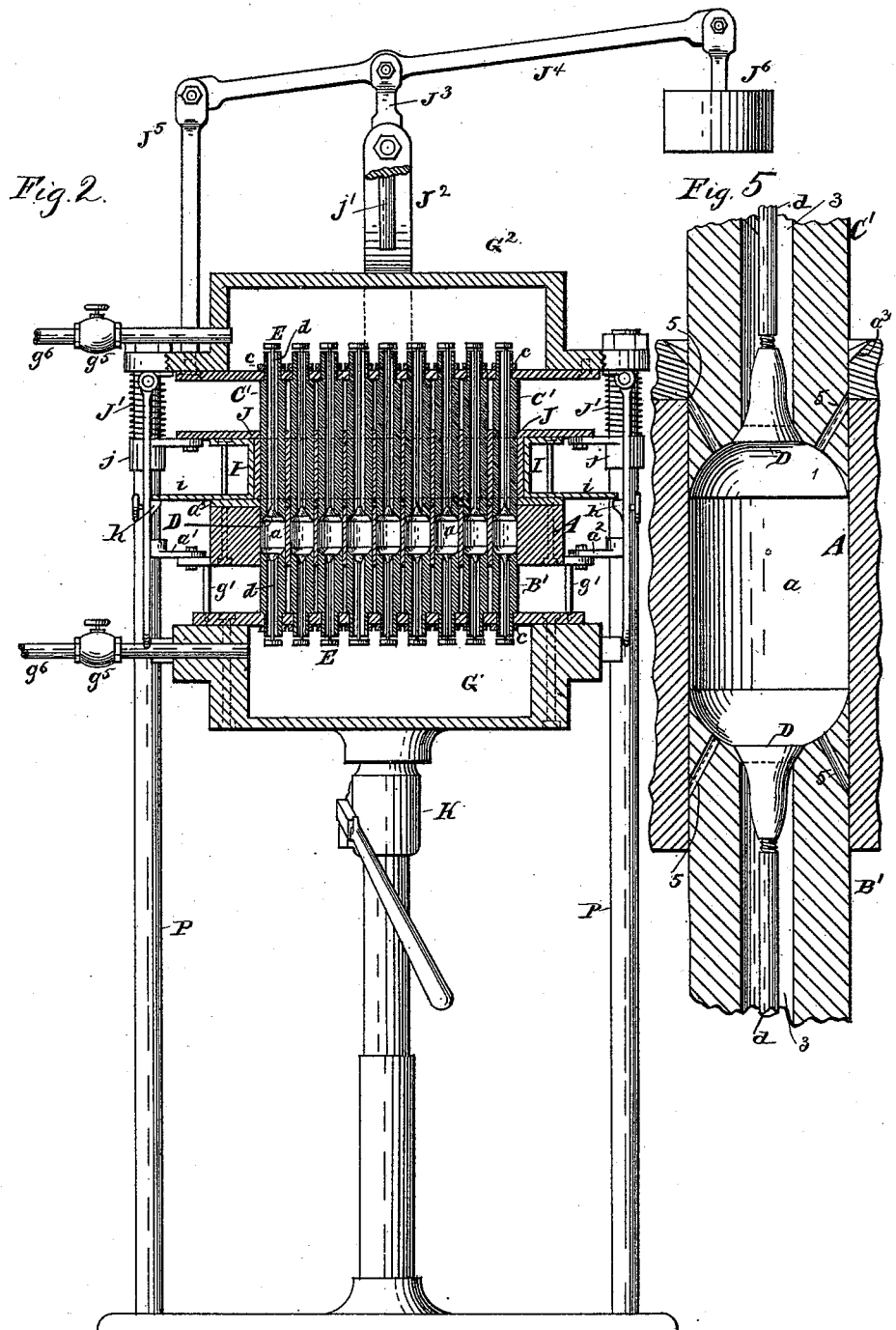

(No Model.) 6 Sheets—Sheet 3.
W. A. HULL & A. G. BOYER.
MACHINE FOR SHAPING PLASTIC MATERIALS.
No. 447,132. Patented Feb. 24, 1891.
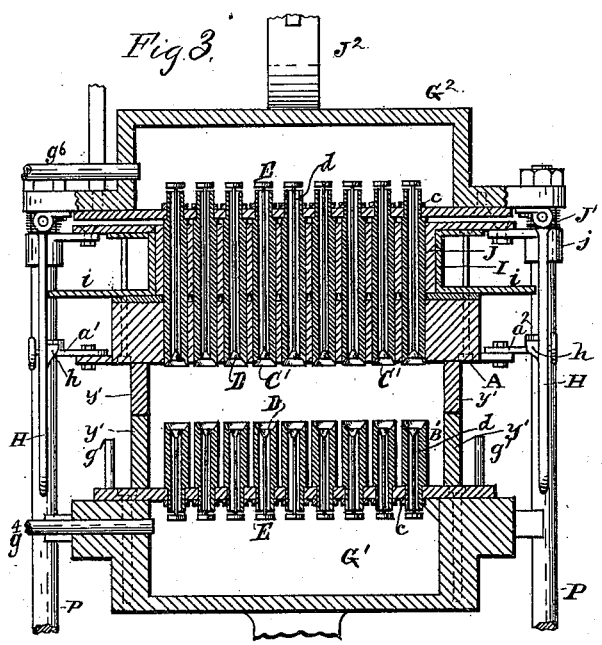
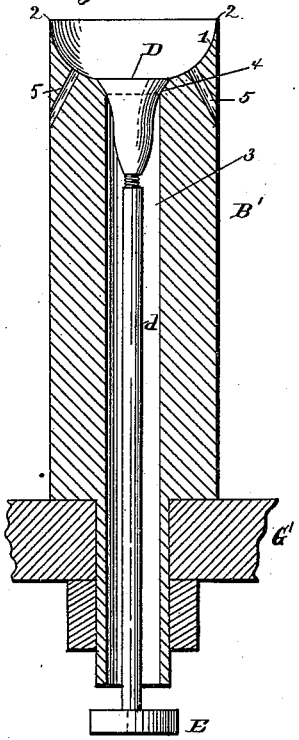
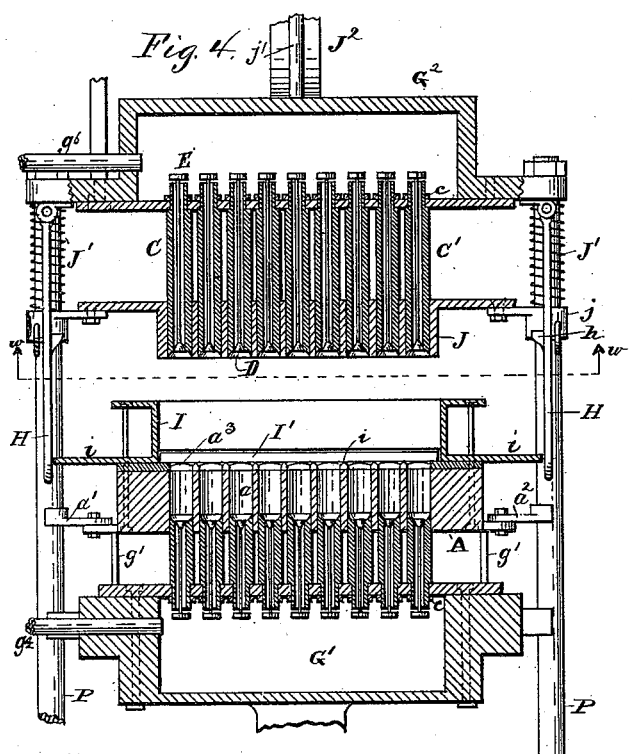
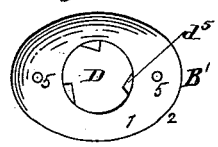
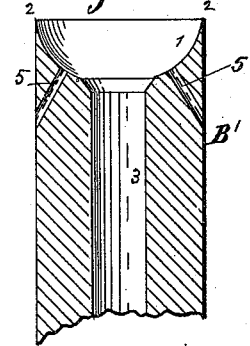
Witnesses
Inventors
Wolcott A. Hull
Arthur G. Boyer
By their Attorneys
Gifford & Brown (No Model.) 6 Sheets—Sheet 4.
W. A. HULL & A. G. BOYER.
MACHINE FOR SHAPING PLASTIC MATERIALS.
No. 447,132. Patented Feb. 24, 1891.
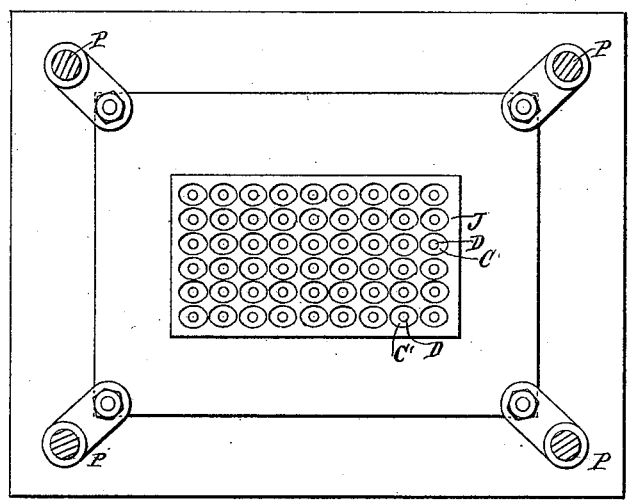
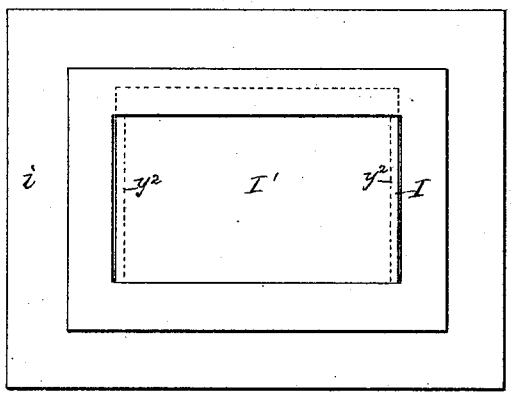
WITNESSES:
INVENTORS.
BY
THEIR ATTORNEYS.

(No Model.) 6 Sheets—Sheet 5.
W. A. HULL & A. G. BOYER.
MACHINE FOR SHAPING PLASTIC MATERIALS.
No. 447,132. Patented Feb. 24, 1891.
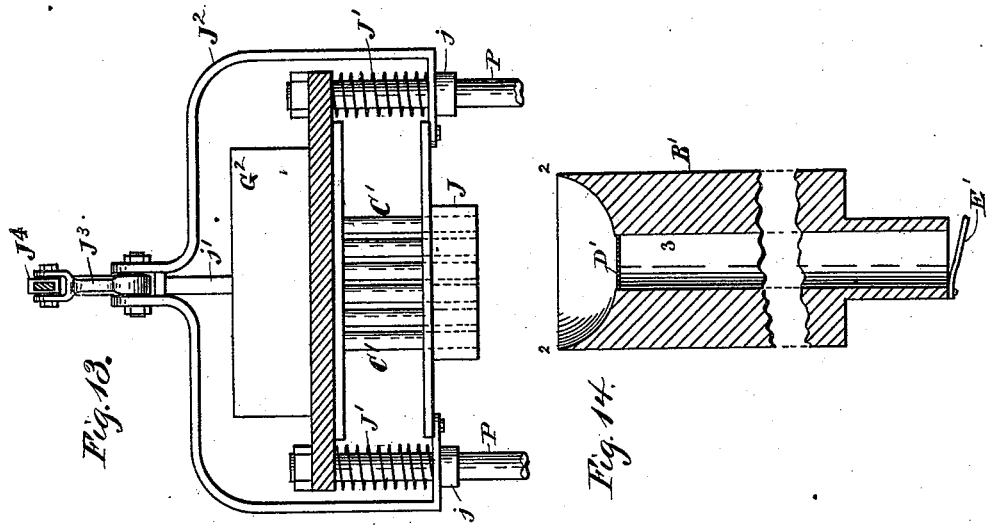
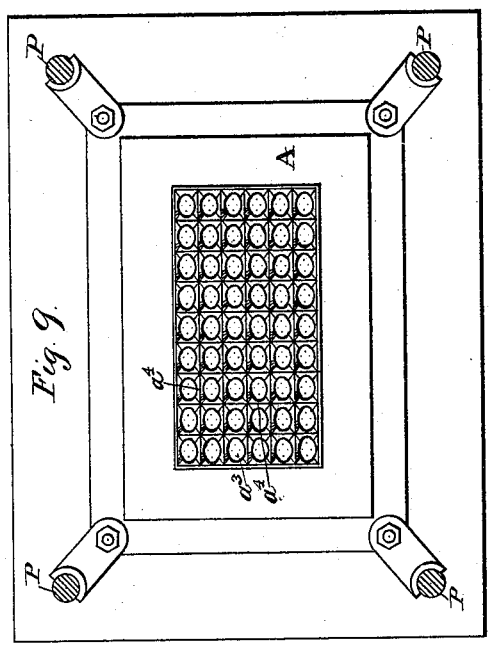
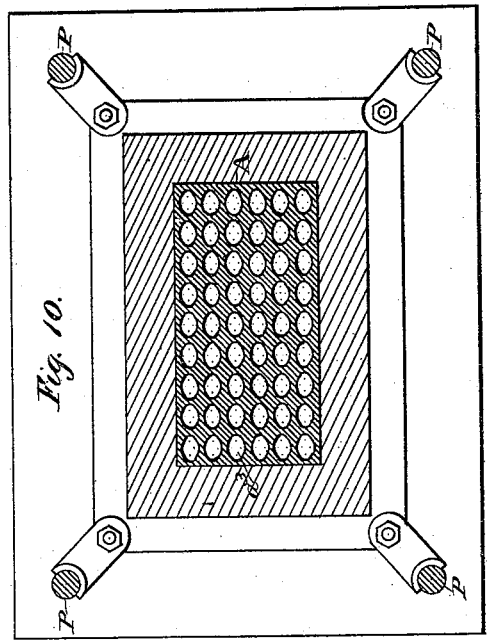

(No Model.) 6 Sheets—Sheet 6.

W. A. HULL & A. G. BOYER.
MACHINE FOR SHAPING PLASTIC MATERIALS.

No. 447,132. Patented Feb. 24, 1891.

Witnesses
Inventors

UNITED STATES PATENT OFFICE.

WOLCOTT A. HULL AND ARTHUR G. BOYER, OF NEW YORK, N. Y.; SAID BOYER ASSIGNOR TO SAID HULL.

MACHINE FOR SHAPING PLASTIC MATERIAL.

SPECIFICATION forming part of Letters Patent No. 447,132, dated February 24, 1891.

Application filed July 13, 1889. Serial No. 317,388. (No model.)

*To all whom it may concern:*

Be it known that we, WOLCOTT A. HULL, of New York, in the county and State of New York, and ARTHUR G. BOYER, of the same place, have invented a certain new and useful Improvement in Machines for Shaping Plastic Material, of which the following is a specification.

Our improvement relates to machines for the shaping of plastic material. We have designed it particularly for shaping yeast-cakes; but it is applicable to the shaping of various other plastic materials.

We will describe a machine whereby the improvement may be carried out, and then point out the various novel features of the improvement in claims.

In the accompanying drawings, Figure 1 is a vertical section of a machine involving our improvement. Fig. 2 is a similar section; but here parts are represented in different positions. Fig. 3 is a similar section of the upper portion of the machine, but representing parts in still another position. Fig. 4 is a similar section of the upper part of the machine, showing parts in still another position. Fig. 4* is a horizontal section on the line *w w*, Fig. 4, looking upward. Fig. 5 is an enlarged vertical section of certain parts in the position in which they are represented in Fig. 2. Fig. 6 is an enlarged vertical section of certain parts. Fig. 7 is a plan or top view of one of the upper parts shown in Fig. 6. Fig. 8 is a central vertical section of the upper part represented in Fig. 6, but with a valve or ejector removed. Fig. 9 is a horizontal section taken at the plane of the dotted line *x x*, Fig. 1. Fig. 10 is a horizontal section taken at the plane of the dotted line *y y*, Fig. 1. Fig. 11 is a vertical section through the body-section of the shaping device. Fig. 12 is a plan or top view of a part of this body-section. Fig. 13 is a sectional side view of the upper portion of the machine, the view being taken looking in the direction indicated by the arrow in Fig. 1. Fig. 14 is a vertical section of one of the end sections of the shaping device modified in construction. Fig. 15 is a top or plan view of a box, showing a movable bottom.

Similar letters and numerals of reference designate corresponding parts in all the figures.

Before entering into a detailed explanation of the machine illustrated in the drawings we will premise that the machine which herein is the principal example of the improvement consists, essentially, of a number of shaping devices severally composed of a body-section and two end sections, the body-section and the end sections working together, so that material to be shaped will be acted upon by the end sections within the body-section.

Referring first to Figs. 1 to 13, inclusive, A designates a block (here shown as having a number of cavities *a*) of elliptical or ellipsoidal form. This forms the body-section of a number of shaping devices. Each portion of the block containing a cavity *a* constitutes the body-section of one of the shaping devices. We remark upon this because the number of forming devices is immaterial to the invention, although important to the commercial success of the invention. The shape of the cavities *a* is to be varied according to the shape which it is desired the plastic material shall derive from treatment in the machine.

B' C' designate end sections of the forming devices. They are to operate within the body-section A in shaping the material upon which they act.

A glance at Fig. 1 will indicate that the body-section and end sections are at a certain time separated.

Reference to Fig. 2 will show that at another time in the operation of the machine the opposite extremities of the end sections are within the body-section.

Fig. 3 shows that at a certain time in the operation of this machine the end sections B' may recede from the body-section A and the end sections C' extend to the lower part of the body-section A.

Fig. 4 shows that the extremities of the end sections B' at a certain time in the operation of the machine are within the body-section A and the end sections C' withdrawn.

Figure 11:
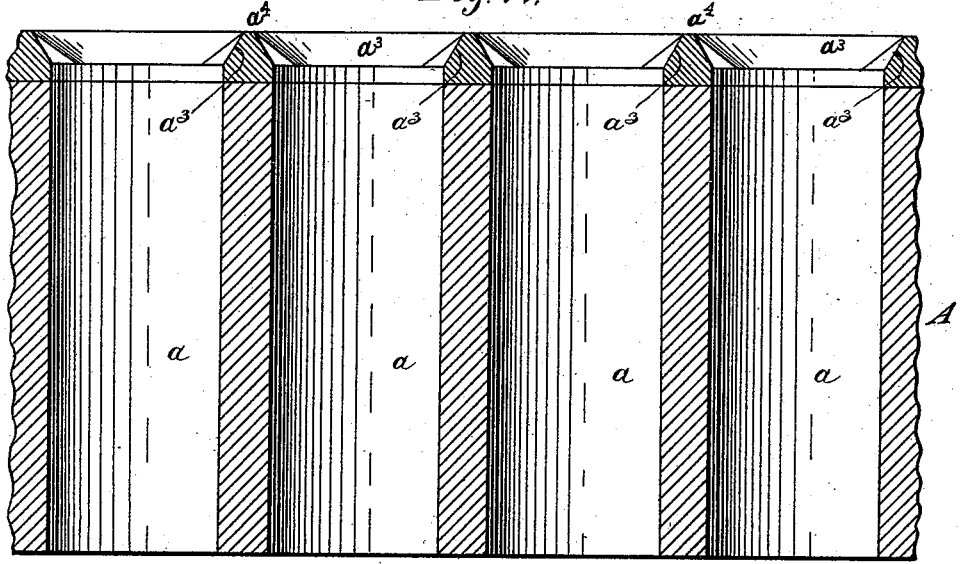

Having given this general explanation of the operation of the shaping devices, we will proceed to a more detailed description of them.

The end sections B' C' are adapted to work within the cavities $a$ of the body-section. At the extremities, which coact with the body-section, are concave shaping-cavities 1. As shown, the extremities of the shaping-cavities are made in the form of sharp edges 2. This enables them to form the ends of cakes or lumps of plastic material, while the body or middle portion is shaped by the cavities $a$ of the body-section A. From the shaping-cavities extend passages 5, through which liquid expressed from the material treated may flow away. Each of the end sections B' C' is shown as made in the form of a tube having an elliptical or ellipsoidal exterior to fit the corresponding cavities $a$, and as having a cylindrical interior cavity 3. Each has combined with it a valve or ejector D, serving to close that end of its cylindric cavity 3 which communicates with its concave shaping-cavity 1. This valve or ejector is capable of moving outwardly, or, in other words, away from the end of the cylindric cavity 3, and toward the edge 2 of the end section with which it is combined.

We have shown the valves or ejectors as made of conoidal form or flaring and the end sections B' C' as provided with seats 4 for the valves or ejectors. The flaring form of the valves or ejectors will deflect escaping gas over the shaping-surfaces of the end sections. Each valve or ejector is shown as having combined with it a stem $d$, which extends through the cylindric cavity 3, and has affixed to the end which is the farther from the body section A a valve E for closing the cavity 3 when the valve or ejector moves outwardly. Preferably the stems $d$ are adjustably connected to the valves—as, for instance, by screw-threads.

The end sections B' C' communicate with chambers G' G². These chambers receive gas, preferably compressed air. The valves or ejectors D rest upon the seats 4 during the shaping of the plastic material. After the shaping is finished and when it is desired to disengage the shaped material from the shaping devices the gas is admitted to the chambers G' G² in proper order, as hereinafter specified, and thereupon it flows through the cavities 3 of the end sections B' C', moves the valves or ejectors D outwardly, and reaches the plastic material. When the gas thus flows to the extremities of the end sections B' C', it serves to disengage the plastic material from the shaping devices. This is done partly by the movement of the valves or ejectors and partly by the direct contact of the gas upon the plastic material. The outward movement of the valves or ejectors D causes the valves E to close the cavities 3 of the end sections B' C' to cut off the gas.

We have now explained in a general way how the end sections and body-section co-operate to shape the plastic material, and how the plastic material is disengaged from the shaping devices. It remains only to give an explanation of the particular devices which in the present example of our improvement we have adopted for effecting these operations.

Figure 12:
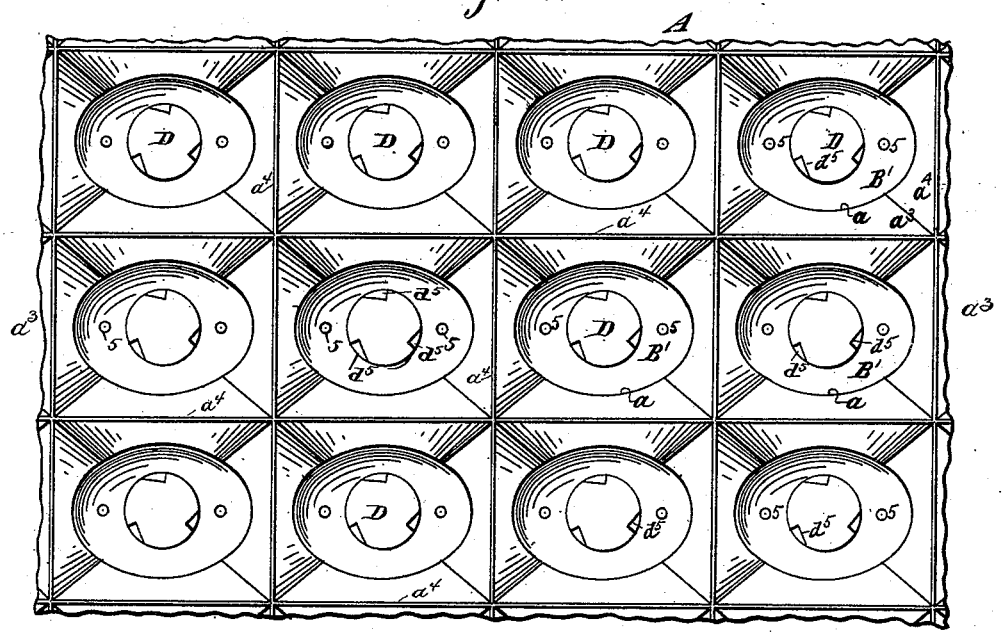

The body-section A is provided at the end which is adjacent to the end sections C' with a number of receiving mouths or funnels $a^3$. These at the lower end conform to the shape of the cavities $a$. They flare outwardly and upwardly and at the extreme upper edge are of rectangular form. This may be best understood by reference to Figs. 9 and 12. Here it will be seen that the edges $a^4$ of the different receiving mouths or funnels are contiguous. The whole space in which these receiving mouths or funnels are arranged is occupied by them, owing to their edges being in contact. As here shown, the receiving mouths or funnels are made in a plate which is separate from the body-section A. This plate is, however, in effect a part of the body-section, and it is not absolutely necessary that the receiving mouths or funnels should be made in a plate, as they may be in the body-section itself.

The body-section A is, in this example of the improvement, supported so as to be movable in the direction of the length of the end sections B' C'. In the present instance it is movable vertically, and has arms $a'$ $a^2$ fitting posts P. It is guided in its movements by these posts. It is supported at times by hangers H, pivotally connected at the upper ends with a fixed portion of the machine, in the present instance with the chamber G², and having at the sides hooks $h$, which may engage with the body-section A or an appurtenance thereof. In the present instance the hooks engage with a plate or flange $i$, forming part of a feed-box I, which is affixed to the body-section A. The under sides of the hooks are inclined or rounded, so that when the body-section A rises the part which is to engage with the hooks may, by acting on the under side of the hooks, first swing the hangers aside, and after passing the hooks may be engaged by the latter, when the hangers return to their normal positions by gravity. The hangers are longitudinally slotted, as we have represented in Fig. 1 by showing one of the hangers partially in section. The hooks $h$ have screw-threaded shanks which extend through the slots in the hangers. Nuts engage with these shanks and serve to clamp the hooks in position. By thus combining the hooks with the hangers we provide for varying the position of the hooks to adapt the machine for the production of cakes or lumps of different lengths. The feed-box, as shown, is of rectangular construction. It is arranged above the body-section A and is open at the top. Its internal area is larger than the portion of the body-section over which the receiving mouths or funnels $a^3$ extend. It has a movable bottom I', which, as here shown, may be slid forward and backward on ways $y^2$, as shown in Fig. 15, to close or open the feed-box to permit or prevent the passage of material from it into the body-section A.

In the present example of our improvement the end sections C' are not movable, and they are made to coact with the feed-box and body-section A through the upward movement of the said box and body-section. These end sections C' are shown as affixed to the under side or bottom plate of the chamber $G^2$. We have shown this bottom plate as made separate from the remainder of the chamber and as secured thereto by screws. We have shown the end sections C' as reduced in diameter at the upper end to form shoulders which fit against the under side of the bottom plate of the chamber, while the extremities extend through said plate and have applied to them above the bottom of the chamber-nuts $c$, engaging with screw-threads. The nuts and the shoulders serve as a means for clamping the end sections in position.

J designates a block which has a number of cavities corresponding in position and preferably also in shape to the cavities $a$ in the body-section A. This block is shown as provided with bearings $j$, which fit the posts P. We have shown springs J' surrounding the posts between the bearings $j$ of the block J and the gas-chamber $G^2$. These springs serve to force the block J downwardly as far as it is capable of moving when no other force interferes with their action. To this block J is connected a strap or frame $J^2$. This extends over the gas-chamber $G^2$, and is connected at the ends to the block J, as may be readily understood by reference to Fig. 13. It is shown as made in two parts connected by a bolt. This strap or frame coacts with the gas-chamber $G^2$, so as to limit the downward movement of the block J. We have shown the strap or frame for this purpose provided with a pin $j'$, which contacts with the top of the box $G^2$ to stop the downward movement of the block J. If desirable, there may be combined with the strap or frame $J^2$ means for forcing the block J downwardly. In the present instance the bolt connecting the two parts of the strap or frame $J^2$ has pivotally fitted to it one end of a link $J^3$, which at the other end is pivotally connected to a lever $J^4$. This lever at one end is fulcrumed to a stand $J^5$ and at the other end carries a weight $J^6$. Either the weight $J^6$ or the springs J' may be employed for effecting the downward movement of the block J, or both may be used together, as shown. Normally the block J occupies its lowest position, in which it is represented in Figs. 1 and 4.

The gas-chamber G' is provided with bearings fitting the posts P and is movable lengthwise of the posts. Motion may be imparted to it by any desired means. We have shown a hydraulic press or jack K for this purpose. The gas-chamber G' is shown as having a removable top plate, which is secured in place by screws or bolts. The end sections B' are shown as secured to this removable top plate in the same manner that the end sections C' are secured to the bottom plate of the gas-chamber $G^2$. The gas-chamber G' is furnished with push-pins $g'$. When this gas-chamber and the end sections B' are elevated, the end sections will enter the lower portions of the cavities $a$ in the body-section A and the push-pins $g'$ will contact with the body-section A, as may be understood by reference to Fig. 4. The further upward movement of the gas-chamber G' and end sections B' will be shared by the body-section A and feed-box I. Thus the feed-box will be brought up to and around the block J. The block J will then substantially fill the feed-box. The upward movement of the gas-chamber G', end sections B', body-section A, and feed-box I will continue. The upward movement of the block J will be resisted by the springs J' and the weight $J^6$. The resisting pressure produced by these parts will, however, be a yielding pressure. Owing to this resistance, which is offered to the upward movement of the block J, the material in the feed-box will be distributed and substantially equalized as to pressure. This having been accomplished, the bottom I' will be opened. The gas-chamber G', end sections B', body-section A, and feed-box I will be moved still farther upward. The material will then enter the cavities $a$ of the body-section. The block J will be carried upward, and as the end sections C' are in the present example of our improvement stationary their extremities, in conjunction with the said block, will, through this upward movement, be caused to force the material into the cavities $a$ of the body-section A and to coact with said cavities and with the extremities of the end sections B' to form the material into cakes or lumps. The parts will then be as represented in Fig. 2. The shaping having been accomplished, when the body-section reaches its highest position, it is engaged by the stops $h$ and held against downward movement until the disengagement of the stops from it. Gas is now admitted to the chamber G'. This may be done by the opening of a cock $g^3$, combined with a pipe or container $g^4$, which conveys the gas to this chamber. This pipe $g^4$ may be connected by any yielding or flexible pipe with a reservoir or container such as shown at $R^{10}$, Fig. 1, or other source of the gas used. The gas admitted to the chamber G' will flow through the cavities 3 of the end sections B' and move the valves or ejectors D outwardly. This outward movement of the valves or ejectors and the contact of the gas itself with the cakes or lumps serve to disengage the cakes or lumps from the shaping-cavities 1 of the end sections B'. A little gas is sufficient to do this work. The closing of the valves E against the inner extremities of the cavities 3 prevents waste of the gas. The disengagement of the cakes or lumps from the various end sections B' may not be simultaneous. The adherence of the cakes or lumps to the shaping-cavities of some of these end sections may be greater than to others. When this is so, the valves E will close the end sections successively. When the gas is cut off from some of the end sections, it is rendered more effective to operate the valves or ejectors of the other end sections in the series or set B'. The gas-chamber G' and the end sections B' are preferably lowered just after the gas has been let on. The end sections will thus be moved out of the cavities $a$ of the body-section A. The gas may be cut off from the chamber G' by turning the cock $g^3$ as soon as the chamber has been lowered. Next gas will be admitted to the chamber $G^2$ by opening a cock $g^5$, with which its supply-pipe or container $g^6$ is provided. The gas admitted to this chamber $G^2$ will act in conjunction with the valves or ejectors D of the end sections C' in the same manner as it acted when admitted to the chamber G' upon the valves or ejectors D of the end sections B'. Moreover, the valves E of the end sections C' will operate in the same manner as the valves E of the end sections B'. The gas flowing through the end sections C' will disengage the cakes or lumps from these end sections and also from the cavities $a$ of the body-section A. Therefore the cakes or lumps will drop from the body-section A. They may be caught in a tray or any other receptacle held beneath the body-section to receive them.

While we have described the method of operating the machine which we generally prefer to pursue a different operation is possible. This different method we will now explain. We will assume that the shaping of the cakes or lumps has been completed and that the gas-chamber G' and end sections B' have been lowered so as to remove the end sections B' from the cavities $a$ of the body-section A. The body-section A will have been left in its lowest position. According to the second method of operation, blocks $y'$ or pins will now be placed between the top of the lower gas-chamber G' and the body-section A and an upward motion imparted to said chamber. In this upward motion the body-section A will participate. The body-section A may be moved up along the end sections C' until the bottoms of the cavities $a$ of the body-section A will be above the lower extremities of the end sections C'. This will result in the ejection or disengagement of the cakes or lumps into a tray or other article held to receive them. The body-section A is shown in this position in Fig. 3. The valves or headers D of the end sections B' will be returned to their seats by gravity. Those of the end sections C' will be forced to their seats by the pressure of the material upon them.

We may add to the description already given as to the operation of the parts that Fig. 1 is not intended to represent all the parts in positions which they actually occupy in use, but is intended to give a clear idea of the construction of the several parts.

Material is supplied to the feed-box while the parts are in the position represented in Fig. 4. The shaping of the cakes or lumps is performed while the parts occupy the positions represented in Fig. 2 and on a larger scale in Fig. 5.

Our improvement will admit of many modifications. For instance, the end sections C' may be made movable as well as the end sections B', and the body-section A may then be made stationary; or the end sections B' may be stationary and the end sections C' and body-section A movable. The end sections might extend horizontally instead of vertically, in which case the body-section would of course be arranged to correspond.

In Fig. 7 we have shown that the valves or ejectors D may have at their peripheries notches or passages $d^5$ to permit of the flow of expressed moisture or liquid into the cavities 3 of the end sections.

In Fig. 14 we have shown that instead of providing the end sections with valves or ejectors D at the intersection of the shaping cavities 1 with the cavities 3 there may be diaphragms of perforated or reticulated material D', and that when these diaphragms are used valves E', operating in conjunction with those ends of the cavities 3 which communicate with the gas-chambers, may be used.

It is obvious that each of the end sections is a shaping device, it being operated in conjunction with an opposite end section and the cavities of the body-section merely because all these parts are necessary to the production of a particular shape.

What we claim as our invention, and desire to secure by Letters Patent, is—

1. The combination of a gas-container, a former or shaping device communicating with the gas-container, a cock or valve intermediate of the gas-container and former or shaping device, and means for supplying the container with gas under pressure, substantially as specified.

2. The combination of end sections or formers, a gas-chamber communicating with said end sections or formers, a container for gas, and a cock or valve intermediate of the gas-chamber and container for gas, substantially as specified.

3. The combination of end sections or formers, a gas-chamber communicating with said end sections or formers, valves or ejectors located in the shaping-surfaces of the formers, and means for supplying gas under pressure for the gas-chamber, substantially as specified.

4. The combination of a gas-chamber, end sections or formers communicating with the gas-chamber, valves or ejectors located in said shapers or formers and made flaring so as to deflect the escaping gas over the shaping-surfaces of the end sections, and a container for gas communicating with the gas-chamber, substantially as specified.

5. The combination of a gas-chamber, end sections or formers having passages leading from the shaping-surfaces of the end sections or formers to the gas-chamber, and valves isolated from the said shaping-surfaces and serving to cut off a supply of gas to said end sections or formers as the contents thereof are ejected, substantially as specified.

6. The combination of a gas-chamber, end sections or formers communicating with said gas-chamber, valves operating by a pressure of gas in the gas-chamber to cut off said communication, and a gas-container communicating with the gas-chamber, substantially as specified.

7. The combination of a shaping device, a gas-chamber with which said shaping device communicates, a valve or ejector co-operating with the shaping device to effect the ejection or disengagement of shaped material therefrom, and a passage in the shaping device adjacent to the said valve or ejector and affording an escape for moisture or fluid expressed from the material, substantially as specified.

8. The combination of a body-section provided with cavities and receiving mouths or funnels made rectangular at the top and arranged at close contiguity, a feed-box arranged beyond the receiving mouths or funnels, and end sections movable through the feed-box to the cavities of the body-section, substantially as specified.

9. The combination of a body-section having a cavity and two opposite end sections constructed to move within the cavity to shape material therein and to carry the shaped material away from the opening at which the material entered and out of another opening, substantially as specified.

10. The combination of a body-section having a cavity, a feed box or receptacle adjacent to said body-section, a block or presser, and an end section working into the cavity of the body-section, said block or presser and end section being constructed to force material from the feed-box or receptacle into the cavity of the body-section, substantially as specified.

11. The combination of a body-section having cavities, a feed-box above the body-section, a block above the feed-box constructed to be received within the feed-box, and end sections extending into the said block and working through said block into the cavities of the body-section, substantially as specified.

12. The combination of a body-section having cavities and movable in the direction of the length of its cavities, a series of end sections beyond one end of the body-section, and a movable series of end sections beyond the other end of said body-section and adapted to extend into the cavities thereof, the support of the latter serving to impart motion to the body-section, substantially as specified.

13. The combination of a body-section having cavities and movable in the direction of the length of its cavities, a series of end sections beyond one end of the body-section, a movable series of end sections beyond the other end of said body-section, and a support for the movable end sections serving to move the body-section toward the first-named series of end sections, both of said end sections adapted to enter the cavities of the body-section, substantially as specified.

14. The combination of a body-section having cavities and movable lengthwise of its cavities, a feed-box at one end of the body-section, a block or presser constructed to be received within the feed-box and movable in the direction of the length of the cavities of the feed-box, a spring or the equivalent thereof for resisting the movement of the block or presser in its upward direction, and end sections working within the block or presser and the cavities of the body-section from opposite ends thereof, substantially as specified.

15. The combination of a body-section having cavities and movable lengthwise of its cavities, catches for sustaining the body-section after it has been moved into a certain position, a feed-box at one end of the body-section, a block or presser constructed to be received within the feed-box and movable in the direction of the length of the cavities of the feed-box, a spring or the equivalent thereof for resisting the movement of the block or presser in its upward direction, and end sections working within the block or presser and the cavities of the body-section at opposite ends thereof, substantially as specified.

16. The combination of a body-section having cavities and movable in the direction of the length of its cavities, a feed-box at one end of the body-section, a block or presser constructed to be received within the feed-box, a strap or frame for limiting the movement of the block or presser in one direction, a spring or the equivalent thereof for moving the block or presser in this direction, and end sections working through the block or presser and into the cavities of the body-section at opposite ends thereof, substantially as specified.

17. The combination of a body-section having shaping-cavities, and at one end of these shaping-cavities receiving mouths or funnels of rectangular form at the outer end and conforming at the inner end to the shape of the said cavities, a feed-box adjacent to the outer ends of the receiving mouths or funnels, end sections conforming externally to the shape of the cavities in the body-section, and a block or presser having openings constructed to conform in shape to the end sections and cavities of the body-section and to fill the space between the exteriors of the end sections, so that the end sections and this block or presser will together serve to force substantially the entire mass of material within the feed-box through the receiving mouths or funnels into the cavities of the body-section, substantially as specified.

WOLCOTT A. HULL.
ARTHUR G. BOYER.

Witnesses:
S. O. EDMONDS,
C. R. FERGUSON.